US008536514B2

(12) United States Patent
Beynon et al.

(10) Patent No.: US 8,536,514 B2
(45) Date of Patent: Sep. 17, 2013

(54) METHOD AND APPARATUS FOR MEASURING THE TEMPERATURE OF A SHEET MATERIAL (75) Inventors: Thomas Geoffrey Ronald Beynon, Dronfield (GB); Ian Hamilton Ridley, Sheffield (GB); Stuart Francis Metcalfe, Sheffield (GB); Andrew Mellor, Rotherham (GB); Ben Wileman, Rotherham (GB)

(73) Assignee: Land Instruments International Limited, Leicestershire (GB)

( * ) Notice: Subject to any disclaimer, the term of this patent is extended or adjusted under 35 U.S.C. 154(b) by 658 days.

(21) Appl. No.: 12/848,038

(22) Filed: Jul. 30, 2010

(65) Prior Publication Data

US 2011/0018721 A1 Jan. 27, 2011

Related U.S. Application Data

(63) Continuation-in-part of application No. 12/340,392, filed on Dec. 19, 2008, now abandoned, and a continuation of application No. PCT/GB2009/000173, filed on Jan. 22, 2009.

(30) Foreign Application Priority Data

Feb. 1, 2008 (GB) .................................. 0801918.4

(51) Int. Cl.
G01J 5/00 (2006.01)
(52) U.S. Cl.
USPC ..................... 250/238; 164/450.3; 164/155.6; 164/154.6
(58) Field of Classification Search
USPC ................. 250/238; 164/450.3, 155.6, 154.6
See application file for complete search history.

(56) References Cited

U.S. PATENT DOCUMENTS

| 4,439,049 A | 3/1984 | Hoogendoorn |
| 4,746,224 A | 5/1988 | Mizuno |

(Continued)

FOREIGN PATENT DOCUMENTS

| DE | 10017405 A1 | 10/2001 |
| JP | 58063822 A | 4/1983 |

(Continued)

OTHER PUBLICATIONS

UKIPO Search Report for GB0801918.4, dated Nov. 12, 2008 (1 page).
Technical program from IS&T/SPIE 20th Annual Symposium, Electronic Imaging Science and Technology, Jan. 26-31, 2008, San Jose, California (76 pages).
PCT/GB2009/000173 International Search Report, dated Aug. 11, 2009 (6 pages).
PCT/GB2009/000173 Written Opinion of the International Searching Authority, dated Aug. 11, 2009 (15 pages).
PCT/GB2009/000173 Response to Written Opinion, dated Nov. 26, 2009 (14 pages).

(Continued)

Primary Examiner — Seung C Sohn
(74) Attorney, Agent, or Firm — Kenyon & Kenyon LLP (57) ABSTRACT

A method of measuring the temperature of a sheet material in which the sheet material is arranged such that it forms at least one side of a cavity so as to enhance the effective emissivity of the sheet material in the vicinity of the cavity. The method involves a) generating a thermal image of at least part of the inside of the cavity using a thermal imaging device to detect radiation emitted by the cavity, the thermal image comprising a plurality of pixels each having a pixel value representative of radiation emitted by a respective region of the cavity; b) identifying a first subset of the plurality of pixels whose pixel values meet predetermined criteria; c) using the identified first subset of pixels to determine a line on the thermal image representative of optimal emissivity enhancement in the cavity; and d) selecting a second subset of the plurality of pixels based on the determined line and generating a temperature profile along the determined line derived from the pixel values associated with each of the second subset of pixels.

46 Claims, 6 Drawing Sheets

(56) References Cited

U.S. PATENT DOCUMENTS

| | | |
|---|---|---|
| 4,883,364 A | 11/1989 | Astheimer |
| 2009/0196324 A1 | 8/2009 | Beynon et al. |

FOREIGN PATENT DOCUMENTS

| | | |
|---|---|---|
| JP | 2002323381 A | 11/2002 |
| JP | 2004279161 A | 10/2004 |
| JP | 2005233731 A | 9/2005 |
| JP | 2005233790 A | 9/2005 |
| JP | 2006003081 A | 1/2006 |
| WO | 2009033928 A1 | 3/2009 |
| WO | 2009095643 A2 | 6/2009 |

OTHER PUBLICATIONS

PCT/GB2009/000173 International Preliminary Report on Patentability—Corrected Version, dated Jul. 16, 2010 (15 pages).

Usamentiaga, Ruben, et al., "Real-time line scan extraction from infrared images using the wedge method in industrial environments," Image Processing: Machine Vision Applications, Proc. of SPIE-IS&T Electronic Imaging, SPIE vol. 6813, 6813OR-1, 2008, pp. 1-12.

International Search Report for International Application No. PCT/GB2009/000173, Aug. 11, 2009.

METHOD AND APPARATUS FOR MEASURING THE TEMPERATURE OF A SHEET MATERIAL

CROSS-REFERENCE TO RELATED APPLICATIONS

This application is a continuation-in-part of U.S. patent application Ser. No. 12/340,392, filed on Dec. 19, 2008, and a continuation of International Patent Application No. PCT/GB2009/000173, filed on Jan. 22, 2009. Both the above-mentioned U.S. application and the PCT Application claim priority from U.K. Application No. 0801918.4, filed on Feb. 1, 2008.

BACKGROUND

This invention relates to methods and apparatus for measuring the temperature of an object, in particular a sheet material, by detecting radiation emitted by the object.

Thermal imagers provide two dimensional temperature images of a scene. Typically, such devices observe and measure infrared emission from the scene, thus providing a measure of temperature without being in contact with the source. Infrared energy is emitted by all materials at temperatures above absolute zero. This energy travels in the form of electromagnetic waves with wavelengths typically in the range 0.7 microns to 20 microns. When an infrared ray is intercepted by a body which is not transparent to the infrared spectrum, it induces electronic transitions or its energy is converted into heat and the infrared rays may be observed. Infrared imaging systems convert the energy transmitted in the infrared spectrum into a visible light image.

On striking a material surface, part of the infrared energy will be absorbed, some will be reflected and the remainder transmitted through the object. Of the energy absorbed by the material, a proportion may be re-emitted. Together, these phenomena determine the "emissivity" of the material, which is defined as the ratio of energy radiated by the material to energy radiated by a black body at the same temperature. A "black body" is a hypothetical object or system which does not reflect or transmit any infrared energy incident upon it. All such radiation is absorbed and the black body re-radiates energy characteristic of its temperature only. A true black body has an emissivity of 1 but the nearest that can be achieved in practice is about 0.998, using an infrared opaque cavity with a small aperture.

Infrared temperature measurements often have to be made on targets with low or variable emissivity. This can lead to substantial errors.

One way to alleviate such errors is to aim the infra-red thermometer into a 'cavity' in the target. This cavity acts to a greater or lesser degree as a 'black-body' cavity. The effective value of the emissivity is raised and stabilised by reflections within the cavity. Measurement errors are thus reduced.

Figure 1A:
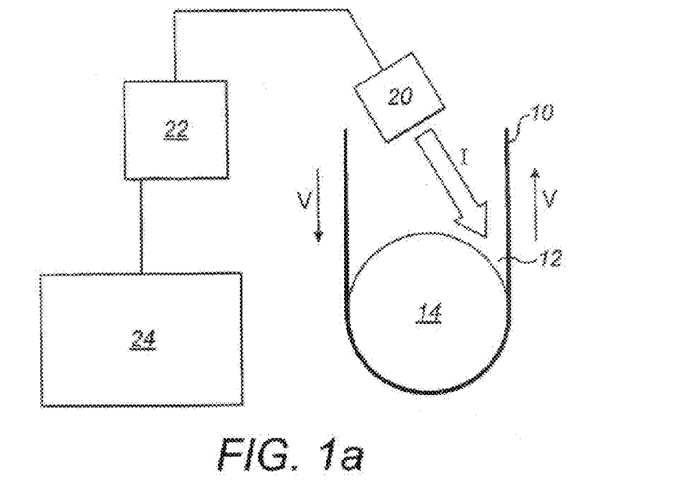
FIG. 1a shows a first embodiment of apparatus arranged for use in the present invention.
Figure 1B:
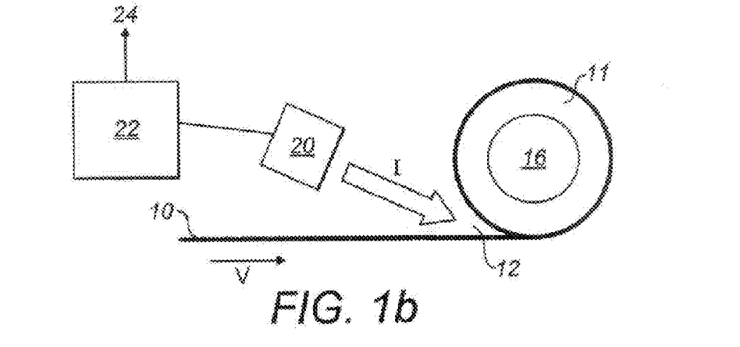
FIG. 1b shows a second embodiment of apparatus arranged for use in the present invention.
Figure 1C:
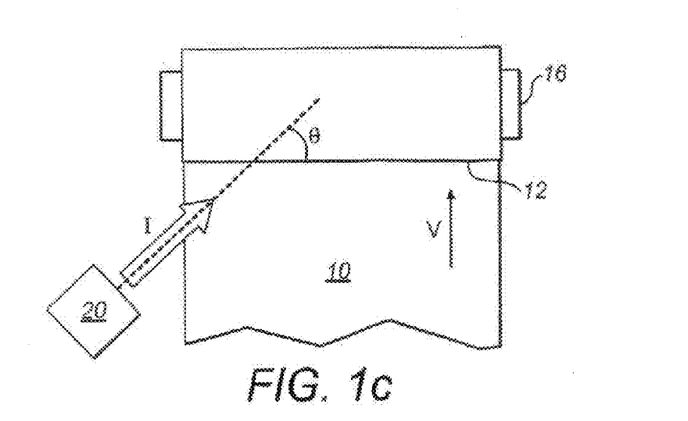
FIG. 1c is a plan view of FIG. 1b.

An important implementation of this idea is where a strip product is either passed over a roller or is coiled around a roller (which may be in the form of a mandrel). The cavity takes the form of a 'wedge' defined between the strip and the roller (or coil) and can act as a very effective black-body cavity. FIG. 1 schematically depicts two examples and indicates the location of the cavity in each case: FIG. 1a shows steel strip in a continuous annealing line and FIG. 1b shows coiling of aluminium strip in a strip mill.

Installations of this type have been made for some years using single spot infra-red thermometers.

A single-spot thermometer has the limitation that only a single 'track' on the strip (eg the centre-line) is monitored. It is also quite difficult to aim the instrument correctly (so as to obtain maximum emissivity enhancement) and to maintain that aim (so as to maintain a stable emissivity enhancement).

An infra-red linescanner can alternatively be used. This allows a temperature profile across the strip to be monitored. However alignment is even more difficult than for a single-spot thermometer.

A newer approach is to aim a thermal imager at the wedge. As described above, a thermal imaging device produces a two dimensional image of a scene and so this allows a temperature image of the cavity to be displayed without precise alignment of the instrument.

Figure 2:
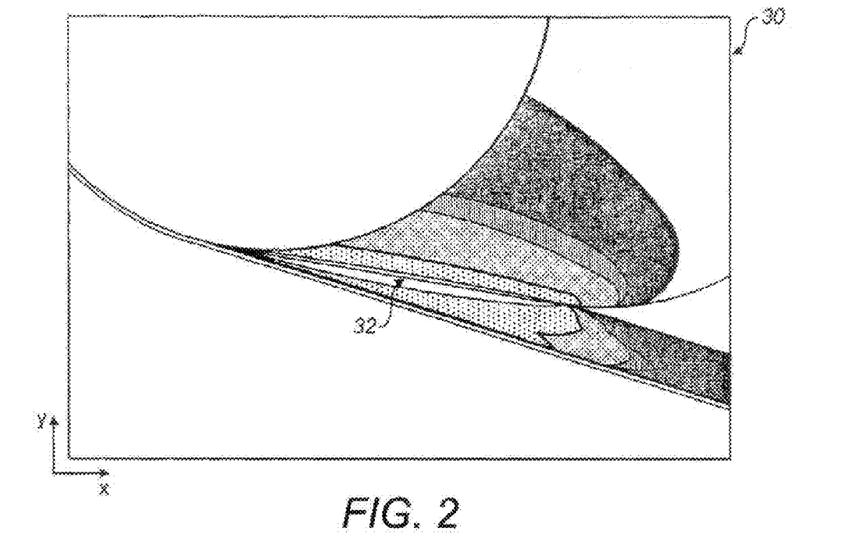
FIG. 2 shows an example of a thermal image.

The region of optimally-enhanced-emissivity in the cavity can be identified by eye from the thermal image. For instance, FIG. 2 shows an example of a thermal image of a 'wedge' cavity formed by an aluminium strip being coiled onto a mandrel, and the region of interest is that comprising the brightest pixels (in reality they may be rendered as red, for example). However extracting temperatures from this region in real time is not easy for several reasons:

The imager is usually mounted off the side of the production line—so the wedge is not 'square' to the field of the imager. It is generally difficult or impossible to align the thermal imaging device 'square' to the cavity since it would obstruct the process line.

The location of the cavity within the image is not known a priori. Instead it depends on the precise alignment of the cavity and that of the imager.

Small changes in imager alignment cause the cavity to 'wander' within the image.

In some situations the cavity is not even approximately fixed in space relative to the imager. An example is the aluminium coiling situation shown in FIGS. 1b and 2 above. Here the coil 'grows' as strip spools on to the mandrel, and the 'wedge' cavity moves in space while the imager remains fixed. The wedge therefore moves appreciably within the image.

In accordance with the present invention, a method of measuring the temperature of a sheet material arranged such that the sheet material forms at least one side of a cavity so as to enhance the effective emissivity of the sheet material in the vicinity of the cavity, comprises:

a) generating a thermal image of at least part of the inside of the cavity using a thermal imaging device to detect radiation emitted by the cavity, the thermal image comprising a plurality of pixels each having a pixel value representative of radiation emitted by a respective region of the cavity;

b) identifying a first subset of the plurality of pixels whose pixel values meet predetermined criteria;

c) using the identified first subset of pixels to determine a line on the thermal image representative of optimal emissivity enhancement in the cavity; and d) selecting a second subset of the plurality of pixels based on the determined line and generating a temperature profile along the determined line derived from the pixel values associated with each of the second subset of pixels.

By determining the line of optimal emissivity enhancement in this way and using it to generate a temperature profile, the invention greatly increases the accuracy with which the temperature of the sheet material can be monitored. The technique accurately 'finds' and 'tracks' the line of optimally-enhanced emissivity in the image and so overcomes the problems of 'wander' within the image and reliance on accurate positioning of the cavity and imager. Further, the invention ensures that the temperature profile is based on data taken from the region of the cavity which offers high and, moreover, consistent emissivity enhancement.

The method of the invention could be applied using a static thermal image. However, it is preferable that the method further comprises repeating steps a) to d) at a predetermined frame rate. For example, the thermal imaging device could periodically update the thermal image, preferably at a rate which produces a substantially real-time video of the strip material. The processing steps b) to d) may also be carried out in substantially real-time or each thermal image may be buffered for subsequent processing.

Step b) may be performed in a number of different ways depending for example on the processing capacity available, the geometry of the cavity and/or the field of the imager. If there is plenty of processing capacity and the imaging device views only the cavity, it may be possible to identify the first subset of pixels by selecting all of those pixels in the image having a pixel value greater than a certain threshold, or within a range of limits, or by selecting the N pixels having the highest pixel values. The predetermined criteria need not result in selection of pixels with the highest pixel values: for example, pixels having values around 50% of the highest pixel values in the image might be selected.

In a particularly preferred example, the first subset of pixels is identified by selecting the pixel having the highest pixel value from each of at least two of the columns of the thermal image, preferably about half of the columns, still preferably about 1 out of every 10 columns.

In another preferred example, the first subset of pixels is identified by selecting the pixel having the highest pixel value from each of at least two of the rows of the thermal image, preferably about half of the rows, still preferably about 1 out of every 10 rows.

These methods could be extended to use all of the columns/rows in the thermal image, however it is preferred to limit the number used so as to reduce processing capacity. These methods are particularly preferred in situations where the cavity geometry is such that it is known that the line of optimally-enhanced emissivity will be, respectively, nominally parallel to the rows of the image ("horizontal") or nominally parallel to the columns of the image ("vertical").

In step c), the line representing optimal emissivity enhancement can be determined in many ways, depending on the geometry of the cavity and the manner in which the first subset of pixels is selected, for example. In some cases, the line representative of optimal emissivity enhancement in the cavity could comprise the first subset of pixels. This may be the case where the pixels are selected from every column/row, or from closely spaced columns/rows such that merely connecting the pixels accurately defines the desired line.

However, it is preferred that the line representative of optimal emissivity enhancement in the cavity is determined by generating a line which best fits the first subset of pixels, preferably using a least-squares fit. This helps to ensure that the line is not distorted by any anomalous pixels.

The step c) method may also involve knowledge of the cavity geometry: for example, where the cavity is formed by a 'wedge' as described above, it is known that the line of optimal emissivity enhancement should be straight, and so a straight line fit can be used. However, the line representative of optimal emissivity enhancement in the cavity need not be rectilinear but could be a polynomial or could comprise more than one linear section.

It should be noted that the line representing optimal emissivity enhancement is an approximation: the actual pixels from which the temperature profile is extracted are selected (using the line) in step d). However, as described below, this second subset of pixels may not be entirely co-incident with the line determined in step c).

It should also be noted that while the 'optimal' emissivity enhancement would usually be considered to correspond to 'maximum' emissivity enhancement, this need not be the case. It may be found for example, that another region gives more stable enhancement and in some cases this might be considered to be preferable.

In step d), the second subset of pixels can be selected using a variety of techniques. In a preferred example, selecting the second subset of pixels comprises:

(i) identifying pixels nearest to the determined line, the identified pixels forming the second subset.

This could involve choosing all pixels within a certain distance of the line, or picking the N pixels closest to the line. The selected pixels may additionally be spaced from each other by a certain distance. The second subset of pixels could be the same as the first subset of pixels.

In particular examples, the pixels nearest to the determined line are chosen by selecting the nearest pixel to the determined line from each of at least some of the columns of the thermal image, preferably all of the columns. Alternatively, the pixels nearest to the determined line are chosen by selecting the nearest pixel to the determined line from each of at least some of the rows of the thermal image, preferably all of the rows. As in the case of selecting the first subset of pixels, less than all of the rows/columns could be used in this step, in order to reduce processing capacity—for example using 1 column/row out of every 10.

In another preferred example, the method is further refined and in step d), selecting the second subset of pixels further comprises:

(ii) for each of at least some of the pixels identified in step (i), defining an array of pixels including the identified pixel, comparing the pixel values of the pixels within the array to locate the pixel having the highest pixel value within the array, and replacing the pixel identified in step (i) with the located pixel in the second subset.

This additional step has been found to significantly improve the appearance of the final temperature map data.

Preferably, the array has a pre-defined size of n×m pixels, n and m being adjustable, for example user-selectable. In a particularly preferred embodiment, the array has a pre-defined size of 5×5 pixels. Advantageously, the array is centred on the identified pixel, although this need not be the case.

Depending on the technique employed in step d), the determined line may automatically lie within the boundaries of the sheet material depicted in the thermal image. However in other examples it may extend beyond and the generated temperature profile might therefore include portions which do not relate directly to the sheet material. In many cases this may be acceptable. However, in order to reduce the amount of processing that is carried out, it is preferable that the method should further comprise:

d1) comparing the pixel values associated with the second subset of pixels with a threshold value to identify one or more edges of the sheet material, terminating the determined line so as not to extend beyond any identified edge(s) and revising the second subset of pixels based on the terminated line.

The temperature profile (based on this revised second subset) would then show only values received from the strip material itself.

Preferably, the threshold value is adjustable, for example user-set. In advantageous alternatives, the threshold value is based on a function of the pixel values associated with the revised second subset of pixels in a previous image frame.

This enables the threshold to be dynamically updated and so takes account of changes in the temperature of the material over time. The function may also take account of a user confidence value.

The generated temperature profile could be used in a number of ways. For example, the profile could be monitored for values exceeding a specified limit and an alarm sounded if the limit is passed. Alternatively, the profile could be used to give an indication of changes in the temperature of the sheet material. However, in many cases it is helpful to be able to have a temperature profile which directly relates to position on the sheet material. It is therefore preferable that the method should further comprise:

e) performing a co-ordinate transformation to produce a second temperature profile related to true position along a direction on the sheet material, based on known geometry of the cavity and the thermal imaging device.

Such a profile which compensates for viewing geometry could be used for example to detect anomalies in the sheet material and accurately locate them.

In most situations, the sheet material will be moving while the thermal image(s) are taken and the temperature profiles generated. Preferably, the sheet material comprises a strip having a width transverse to its direction of motion, and the second temperature profile is along the width of the strip.

In order to relate temperature measurements to position on the sheet material in the direction of movement, it is advantageous to have a two-dimensional thermal 'map' of the material. Preferably, the method therefore further comprises:

f) generating a temporal thermal map of the sheet material based on the second temperature profile generated for each frame, the map having co-ordinates of time vs. position along a direction of the sheet material, preferably width.

Still preferable would be a map directly related to true spatial location on the sheet material. Therefore, the method advantageously further comprises:

g) monitoring motion of the sheet material and generating a spatial thermal map of the sheet material based on the second temperature profile generated for each frame and the distance moved by the sheet material between frames, the map having co-ordinates of distance along a motion direction of the sheet material vs. position along a direction of the sheet material, preferably width. A motion sensor is provided to measure the speed of the material.

In the case of either the temporal or the spatial thermal map, the map may be generated for only a portion of the sheet material, as desired.

It can also be advantageous to additionally take temperature measurements from outside the region of emissivity enhancement, for example outside the cavity. Here, the temperatures measured are "apparent" temperatures because the emissivity of the material has not been enhanced or stabilised.

Therefore, preferably the method further comprises:

h) defining a second line in the thermal image spaced from and referenced to the determined line representative of optimal emissivity enhancement in the cavity; selecting a third subset of the plurality of pixels based on the second line and generating an apparent temperature profile along the second line derived from the pixel values associated with each of the third subset of pixels.

Advantageously, the second line represents a region of the sheet material outside the region of emissivity enhancement.

Since the location of the second line is dependent on that of the determined line (step c), it too 'tracks' movements within the image due to misalignment or coil growth for example.

The second line can be terminated at the strip edges and used to generate an apparent profile directly related to the strip width as well as temporal and spatial thermal maps in the same way as for the line determined in step c).

The data derived from the first determined line can be used in combination with that derived from the second line to compute emissivity profiles or maps. Advantageously, the method further comprises:

l) generating an emissivity profile or emissivity map based on a comparison of the first or second temperature profile, or temporal or spatial thermal map derived from the line determined in step c), with the respective apparent profile or map derived from the second line defined in step h).

This step may be performed in a number of ways. In a first example, for each temperature value in the temperature profile/thermal map, the equivalent black body radiance is calculated using the Planck function and the known wavelength band. The same calculation is performed for each apparent temperature value in the apparent temperature profile/apparent thermal map. The emissivity is the ratio of the two black body radiance values and can be calculated for each point along the profile or in the map. Alternatively, to reduce processing capacity, the emissivity could be calculated by directly ratioing observed radiances along the first and second lines either before or without converting to temperature. With any of these methods, the calculation could be performed by comparing the first and second lines taken from the same thermal image (ie in the same frame), or from different frames. For example, the data from the second line in a first frame could be compared with the data from the first line in a subsequent frame taken after an appropriate interval such that both lines relate directly to the same position on the strip material.

Preferably, the method further comprises:

m) comparing the generated temperature profile, apparent temperature profile, emissivity profile, thermal map or emissivity map with predetermined limits and triggering an alarm signal if a value (eg. temperature, radiance or emissivity) falls outside the predetermined limits. This may be used, for example, to avoid plant fires.

Advantageously, the method further comprises:

n) performing pattern recognition on the generated temperature profile, apparent temperature profile, emissivity profile, thermal map or emissivity map to detect anomalous patterns and triggering an alarm signal if an anomalous pattern is detected. This may be used, for example, to identify contamination or foreign bodies on the strip. Anomalous patterns which may be sought include, for example "holes" of low temperature in the sheet material.

Preferably, the detected radiation is infrared radiation, preferably having a wavelength of approximately 3 to 5 microns or 8 to 14 microns, still preferably approximately 3.3 to 3.5 microns, 3.8 to 4.0 microns, 4.6 to 5.4 microns, 7.6 to 8.4 microns or 7.8 to 8.0 microns. Relatively low wavelengths (3 to 5 microns) are preferred where the strip material is hot (above approximately 200 C), and higher wavelengths (around 8 to 14 microns) where the sheet material is cool (below approximately 200 C). Radiation filters may be provided in order to select the operation bandwith. This may be particularly useful depending on the target material and atmosphere.

Preferably, the pixel values correspond to radiance and step d) comprises converting the radiance values of at least the second subset of pixels to temperature values using the Planck function and the known wavelength band of the radiation. This minimises the processing necessary for the thermal imaging device to carry out, but in alternative examples, the imager could convert the radiance values to temperatures and output these as the pixel values.

Advantageously, the cavity is defined between the sheet material and a roller arranged to support the sheet material. However, suitable cavities could be constructed in many other ways by manipulating the sheet material as desired.

Preferably, the sheet material is wound onto the roller, the roller preferably comprising a mandrel, still preferably a split mandrel of adjustable diameter for facilitating removal from the wound sheet material.

Typically, the method is advantageously used to measure the temperature of metallic sheet materials such as metals or alloys but preferably, the sheet material is aluminium strip, steel strip or bright steel strip.

The invention further provides a temperature-measurement system adapted to perform the above-described method, comprising:
  a thermal imaging device arranged to view at least part of a cavity, of which a sheet material forms at least one side, and being adapted to detect radiation emitted by the cavity to thereby generate a thermal image of at least part of the inside of the cavity, the thermal image comprising a plurality of pixels each having a pixel value representative of radiation emitted by a respective region of the cavity; and
  a processor adapted to:
    identify a first subset of the plurality of pixels whose pixel values meet predetermined criteria;
    use the identified first subset of pixels to determine a line on the thermal image representative of optimal emissivity enhancement in the cavity; and
    select a second subset of the plurality of pixels based on the determined line and generate a temperature profile along the determined line derived from the pixel values associated with each of the second subset of pixels.

Preferably, the thermal imaging device comprises an uncooled microbolometer detector array.

Conveniently, the system further comprises a mount adapted to support the thermal imaging device, the mount preferably arranged to enable rotation of the thermal imaging device about at least one axis, preferably two orthogonal axes.

Preferably, the mount enables the thermal imaging device to rotate about two orthogonal axes of which one axis is substantially perpendicular to the direction of motion of the sheet material.

In some examples, the mount is arranged to enable rotation of the thermal imaging device about three orthogonal axes.

Advantageously, the thermal imaging device is contained within a protective housing.

The processor may operate in a stand-alone manner, but preferably, the system further comprises a plant computer to which the results of the processor are output. The plant computer may further receive results from many such processors connected to imagers located around the plant.

Preferably, the processor is connected to the thermal imaging device preferably via one of an ethernet, internet, intranet, TCP/IP, object linking and embedding for process control (OPC), serial port connection or wireless connection.

Advantageously, the processor is connected to the plant computer preferably via one of an ethernet, internet, intranet, TCP/IP, OPC protocol, serial port connection or wireless connection.

Examples of methods and apparatus in accordance with the present invention will now be described with reference to the accompanying drawings.

DETAILED DESCRIPTION

Suitable apparatus for performing the present invention is shown schematically in FIG. 1. FIG. 1a shows a sheet material 10, such as steel, supported around a roller 14 during a process such as annealing. The sheet material moves as indicated by the arrow v. FIG. 1b gives a second example, in which sheet material 10, such as aluminium strip, is coiled on to a mandrel 16. The mandrel may be split such that it can be expanded during coiling then subsequently collapsed to facilitate removal of the coil 11.

In both cases a cavity 12 is formed between the sheet material and the roller 14 (or mandrel 16). In FIG. 1a, the sheet material 10 forms only one side of the cavity, whereas in the case of FIG. 1b, both sides are provided by the sheet material, since it is wrapped around mandrel 16. The cavity 12 enhances the effective emissivity of the sheet material to a greater or lesser degree, according to the varying size of the cavity.

A thermal imaging device 20 is arranged to view at least part of the cavity 12, as indicated by arrow 1. In practice, the imager 20 may be offset from the sheet path as shown best in FIG. 1c. The imager views the cavity 12 at an angle θ. The imager is preferably based on an uncooled microbolometer detector, comprising an array of microbolometers. Each microbolometer generates a signal corresponding to one pixel of the output image. The detector operates in the wavelength band approximately 8-14 microns for installations where the target is usually below about 200 C; it operates in the wavelength band approximately 3-5 microns for measurements on targets usually above 200 C. More restrictive waveband filters eg 3.8-4.0 microns or 4.6-5.4 microns may be advantageous depending on the target material, temperature and sight path atmosphere.

The thermal imaging device 20 may be supported in a mount (not shown) which preferably comprises a pillar with a collar rotating about this axis; and a protective housing for the imager fixed to this collar via a pivot about an orthogonal axis. This enables the imager to be rotated about two orthogonal axes and in some examples the imager could additionally be rotatable about a third orthogonal axis.

In typical installations, the pillar is aligned substantially perpendicularly to the strip surface: for example, where the strip surface is nominally horizontal, the pillar is vertical. Generally, the axes of rotation are aligned nominally perpendicular and parallel to the direction of strip motion.

The camera 20 preferably exports the thermal image in the form of digital information via an ethernet, internet, intranet, TCP/IP, OPC, serial port connection or wireless connection to a processor 22 (such as a PC-based computer) which processes the data. The digital information from the camera 20 comprises a 2-dimensional array of radiances, ie radiance versus x,y position in the image. Alternatively the radiance values can be converted to temperature values in the imager. In this case the data transferred is temperature versus x,y position. It is preferable to export radiance rather than temperature because it requires less signal processing in the camera: conversion of radiance to temperature then takes place later in the processor.

The processor 22 may further be connected to a plant computer 24 via any of the above connection means for receiving the results of the processing. Either or both of the processor 22 and plant computer 24 may be provided with output means such as a monitor or loudspeaker, and input means for receipt of commands from a user.

Figure 3:
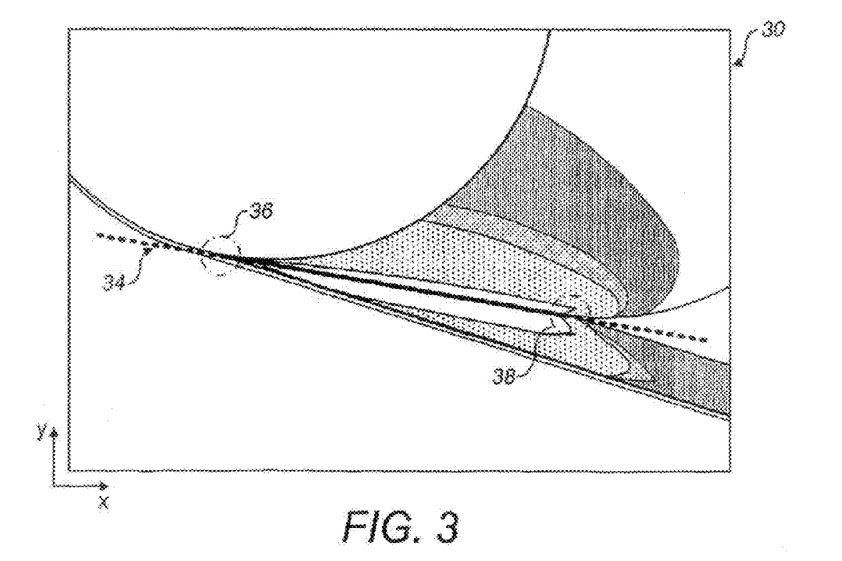
FIG. 3 shows an example of a thermal image and determined line thereon.

FIGS. 2 and 3 show a thermal image 30 captured by camera 20. The thermal imaging device 20 is preferably aimed so that the wedge cavity 12 is nominally parallel to either the x or y axis in the thermal image 30, and also so that the wedge cavity 12 remains within the image 30 throughout any expected motions.

In the following example, we will assume the cavity 12 is nominally parallel to the 'x' axis in the image 30—ie parallel to pixel rows rather than columns. As explained above it could be the other way around.

Figure 4A:
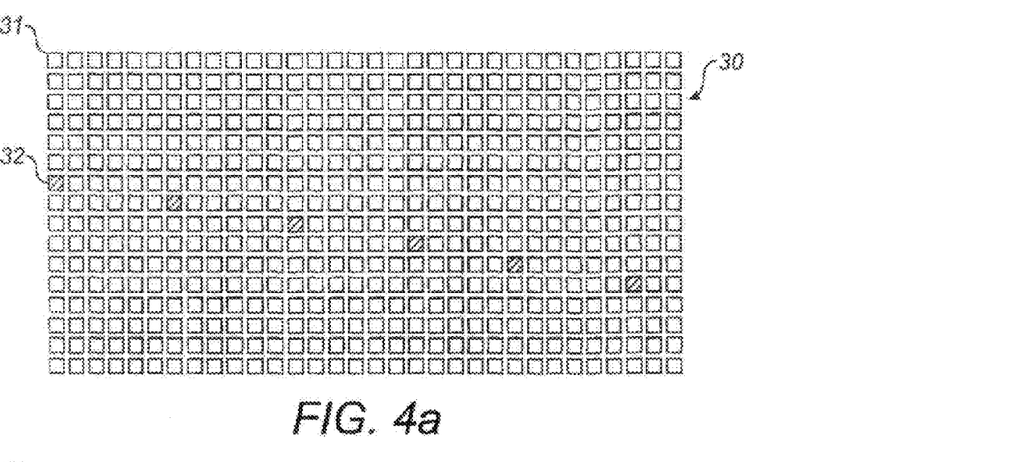
FIGS. 4a, b, c and d show schematic representations of pixels forming part of a thermal image and steps which may be involved in determining the first subset of pixels, the line representing optimal emissivity enhancement and the second subset of pixels.
Figure 4B:
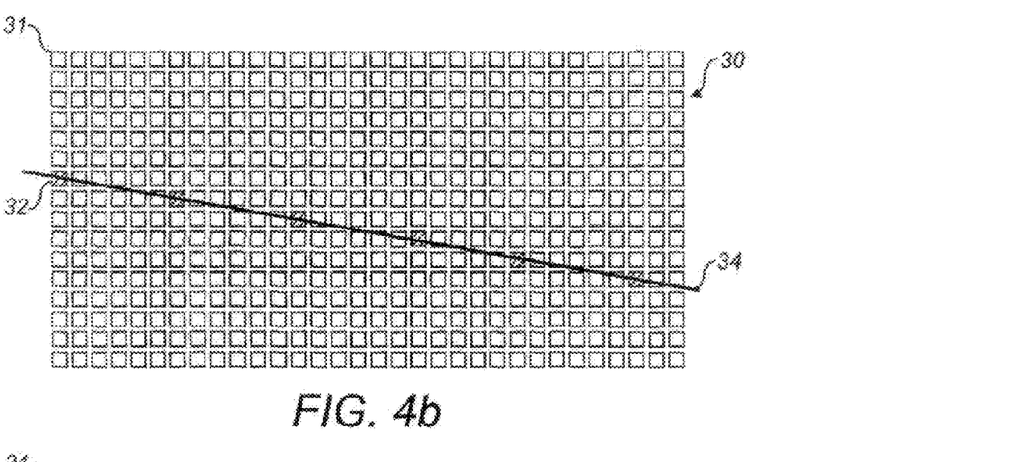
Figure 4C:
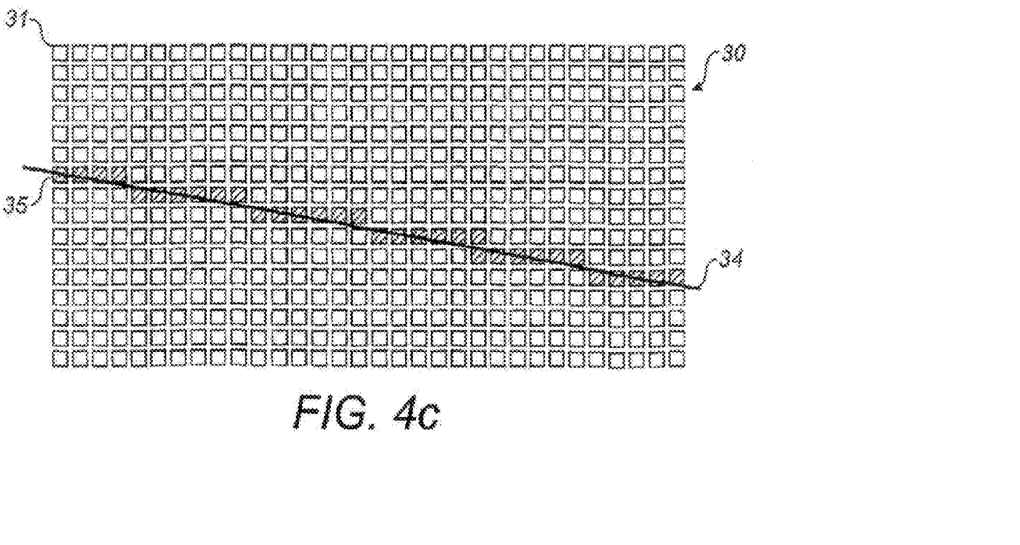
Figure 4D:
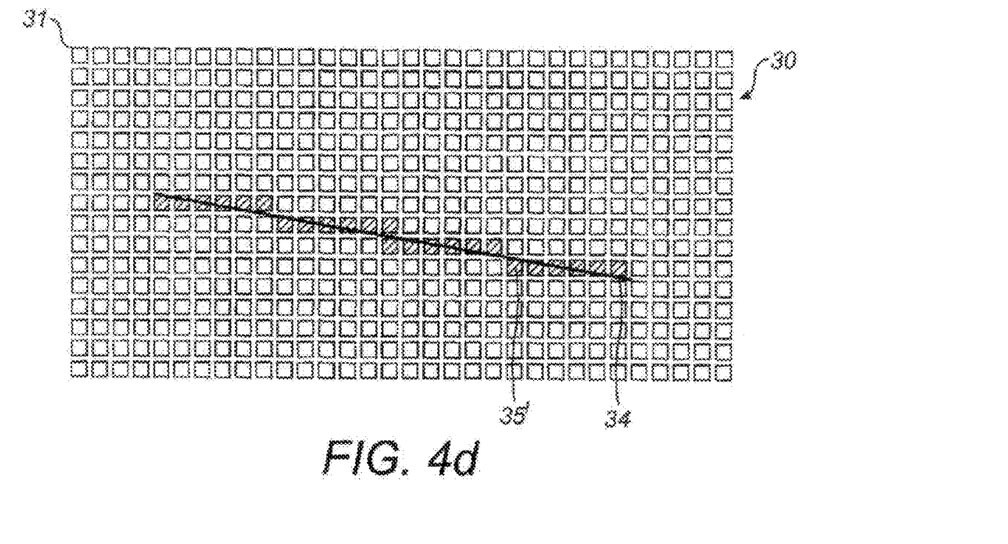
Figure 5:
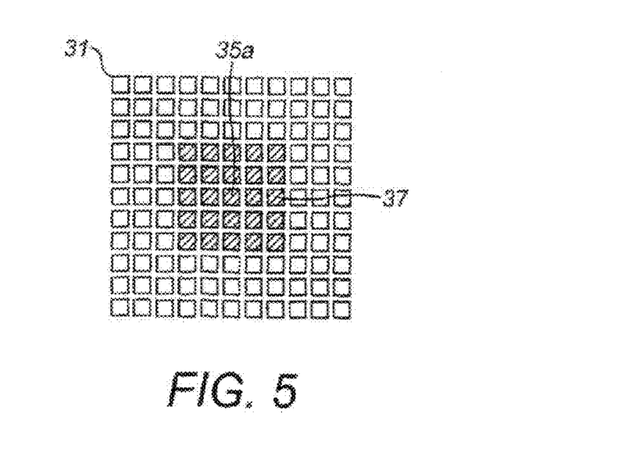
FIG. 5 shows a schematic representation of an array of pixels which may be used in identifying the second subset of pixels.

FIGS. 4 and 5 are schematic representations of the thermal image 30, showing the individual pixels 31. It will be noted that the coarseness of pixelation is greatly exaggerated in the Figures for clarity. In practice, there are typically 320×240 pixels in each image frame. Further, rather than perform the following steps on the whole image, the process could be carried out on a user-defined area within the image 30.

We will assume the thermal image pixels 31 represent radiance. As explained above they could have been already converted to temperature inside the camera.

In a first step, the processor identifies a first subset of pixels in the image 30 based on a predetermined criteria. The first subset pixels are shown in grey in FIGS. 4a and 4b, and labelled 32. In this example, the processor selects the first subset by analysing a number of columns of pixels in the image. The number here is adjustable to suit the particular application, as is the spacing between selected columns—but typically approximately 30 equi-spaced columns are analysed within a 240 by 320 pixel image. For example, every Nth column could be analysed, where N is user-selectable and typically around 10. In the example shown in FIG. 4 every sixth column is selected. The method finds the highest value pixel in each selected column and identifies the corresponding x, y coordinates. These form the first subset 32. For context, FIG. 2 indicates the approximate location of the first subset relative to the wedge.

In the next step, the processor uses the selected first subset 32 to determine a line 34 in the image which represents optimal emissivity enhancement in the cavity. In this example, this is achieved by fitting a line 34 through the identified x,y coordinates, using a least-squares method of fitting. This is shown in FIGS. 3 and 4b. Usually a straight line is used but, in some situations, a more complex line (e.g. described by a polynomial equation) may be appropriate. The shape of the selected line may depend on the geometry of the cavity. For example, in a wedge shaped cavity as shown in FIG. 1, the area of optimal emissivity enhancement typically follows the (straight) line of contact between the roller and the sheet. However this may not always be the case.

Figure 6A:
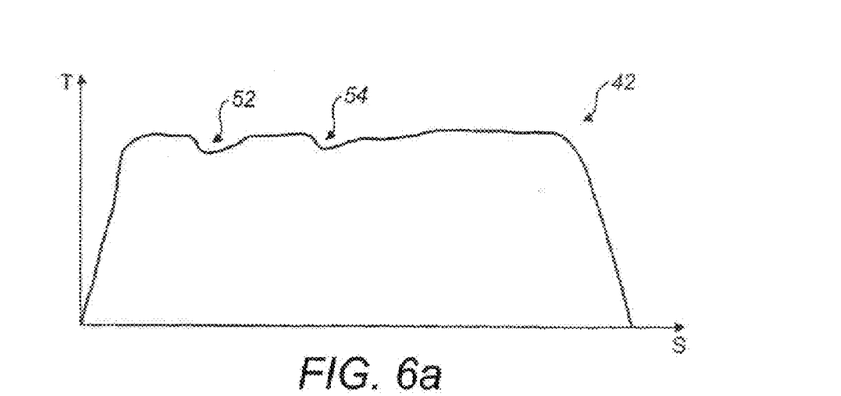
FIG. 6a depicts a temperature profile based on the determined line.

Once the line of optimal emissivity enhancement has been determined, the processor attributes a radiance value to a multiplicity of points (a second subset of pixels) along the line 34. This may be performed in a number of ways. In a first example, the radiance values of pixels nearest the line 34 are selected, as shown in FIG. 4c. The selected pixels are labelled 35 and form the second subset. These radiance values are then converted to equivalent temperatures by reference to the Planck Function and the known wavelength band and calibration constants of the thermal imager. The output is a table of temperature T versus position s along the line 34. This is shown graphically in FIG. 6a, in the form of temperature profile 42.

The entire line 34 as now defined may be used to select the second subset of pixels (and so generate the temperature profile). However, in this example, the line 34 is terminated where the selected pixel values fall below a threshold value corresponding to a minimum plausible radiance on the hot product—ie the line now represents the line of optimally-enhanced-emissivity across the wedge cavity and terminates at the strip edges, represented by points 36 and 38 in FIG. 3. The terminated second subset of pixels is shown in FIG. 4d.

The threshold value above is preferably dynamically updated. A user-set (or otherwise adjustable) initial value is used for the first frame. The line is identified and terminated as above for this first frame. A function of the radiance values along this line is calculated and used as the threshold value for the next frame. This function is typically an average multiplied by a user-set 'confidence' fraction. For example if the confidence fraction is 0.5 then the threshold radiance for successive frames is set to 50% of the average in-line radiance in the preceding frame.

The above technique provides an adequate output representative of optimal emissivity enhancement, but in another embodiment this can be refined further by adding a second stage to the procedure for identifying the second subset of pixels 35. The above described method outputs a table of pixel values and addresses for the identified pixels 35 nearest to the line 34. In an optional second step, depicted in FIG. 5 (showing an exemplary pixel 35a, belonging to the second subset), the following operation is performed for each identified pixel (i.e. each pixel in the table):

- Define an array of pixels 37 around the identified pixel 35a. The array 37 can be an array of size n×m pixels. In the present example a 5×5 array is used. The array 37 should include the identified pixel 35a and is preferably centred on it.
- Compare the pixel values in the array 37 with each other to locate the pixel with the highest value. In the present example, this is the originally identified pixel 35a although this is often not the case.
- Replace the identified pixel 35a with the located pixel (having the highest pixel value in the array) to form a new second subset of pixels.

The size of the n×m array is preferably adjustable; for example it could be user-defined or set by a commissioning engineer. There are several ways in which such adjustability can be incorporated, including:

a) Write the processor code in such a way that it is easily modified;

b) Put the adjustable data into an editable data file that the code accesses;
c) Have a user-set parameter but hide it behind an 'engineer only' access password; or
d) Have a user-set parameter accessible on-screen.

Similar techniques can be applied to the adjusting of the initial threshold value.

In some cases it may be desirable to perform this second stage of refinement on only some of the pixels forming the second subset (e.g. every $M^{th}$ pixel). The revised table of pixel value and addresses is then output and used to generate the temperature profile. As in the previous example, the set of pixels may be "terminated" at each edge of the strip by applying a suitable threshold. This may be performed before or after the second stage of refinement.

The additional steps described above have been found to give a significant improvement in the appearance of the final temperature map data. It is believed this is a result of:

i) The pixels being finite in size: an oblique line of best measurement results in a 'staggered' array of 'nearest' pixels—see FIG. 4c. As the line moves slowly, the staggering changes quickly, which gives fluctuations in the data table resulting in a fixed temperature pattern when referenced to the product. The fluctuations are of reasonably low magnitude so this pattern has little impact on the actual quality of the measurement, but the patterns are visible to the user and rather obviously artefacts of the system.

ii) There is always some level of fixed-pattern noise in a pixelated detector array. This is variation in signal gain and offset and tends to be line-by-line rather than randomly scattered. In particular, if there is an odd-even line variation, this will act to exacerbate the effect described above.

iii) Typically a straight line of best measurement is a good choice to 'fit' to the data, but the true line of best measurement may not be exactly straight—either in reality or due to distortions in the optical system. The 'goodness of fit' may then vary as the target moves within the image.

The two phase 'hunting' approach described above compensates to a degree for all three problems.

Whichever of the above techniques is adopted, calculations are repeated frequently, typically for every frame received from the imaging camera. The line therefore 'tracks' movement of the wedge cavity within the image.

An image generally as per FIG. 3 may be displayed to the plant operator, providing a very powerful assurance that the system is 'locked on' to and 'tracking' the wedge cavity. For simplicity and clarity, the displayed image will typically show the line 34 rather than the second subset of pixels 35. The displayed image is preferably refreshed for each frame, to show the cavity in real time.

Figure 6B:
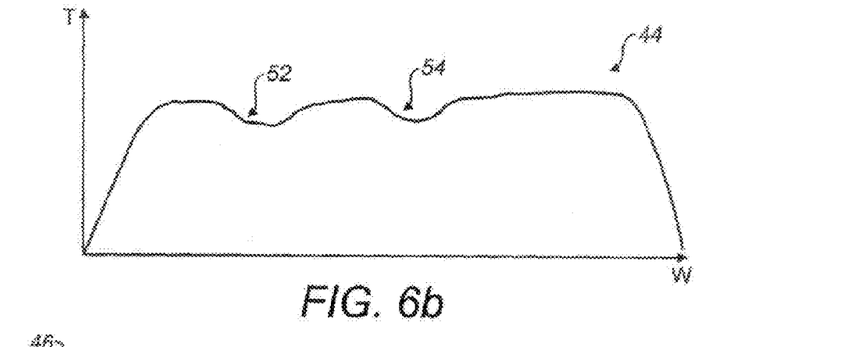
FIG. 6b depicts a temperature profile along the width of the sheet material.

The temperature profile 42 can be used directly in a number of applications, including identification of alarm scenarios and general monitoring for temperature changes over time. However in this example, the processor 22 uses the known geometry of the installation (eg. angle θ) to transform the coordinate s (which is distance across the wedge cavity as projected in the image) to a coordinate w which is true distance across the wedge cavity (i.e. across the width of the strip, approximately perpendicular to its direction of motion). The output is a temperature table (profile) T versus w. Typically w is referenced to the strip centre-line, the centre-line position being taken as half-way between the line ends 36 and 38. FIG. 6b illustrates this output graphically in the form of temperature profile 44.

Figure 6C:
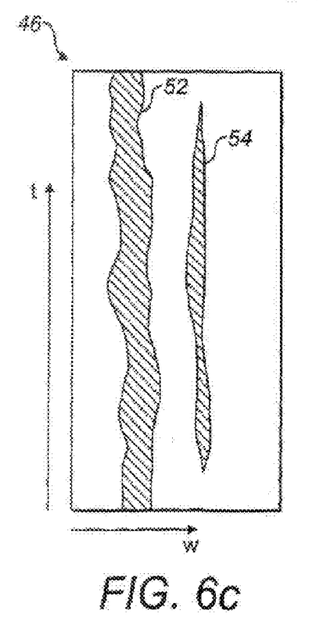
FIG. 6c depicts a temporal thermal map of the sheet material.

In many applications it is advantageous to be able to relate the temperature profile to the position of the sheet material in the direction of transport. Therefore, in this example, the processor generates a temporal temperature 'map' of the strip where one axis is position across the strip and the other time, with pixel colours representing temperature, by recording each temperature profile 44 and displaying them alongside one another, spaced according to the time interval between the points at which the corresponding thermal images were taken. This is shown in FIG. 6c as map 46.

Figure 6D:
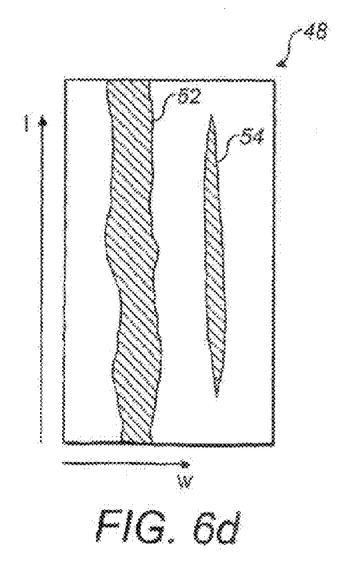
FIG. 6d depicts a spatial thermal map of the sheet material.

If a strip speed sensor (of any known type) is connected to the system, this map may be redrawn with axes corresponding to distances across and along the strip. This is shown in FIG. 6d as map 48.

The profiles 42, 44 or maps 46, 48 may be analysed with respect to known limits and an alarm actuated if the limits are exceeded. The profile or map may be analysed for anomalous features—'holes' (regions of low temperature)—corresponding to contamination or foreign objects on the strip and an alarm actuated.

FIG. 6 shows examples of anomalous features 52 and 54 and limits $T_{max}$ and $T_{min}$. If any feature were to exceed $T_{max}$ and an alarm may be triggered, or in another example the operator could be alerted to investigate further. In some examples, the limits could be used to trigger the production of a thermal map of the relevant area of the sheet material which has exceeded the limits.

Figure 7A:
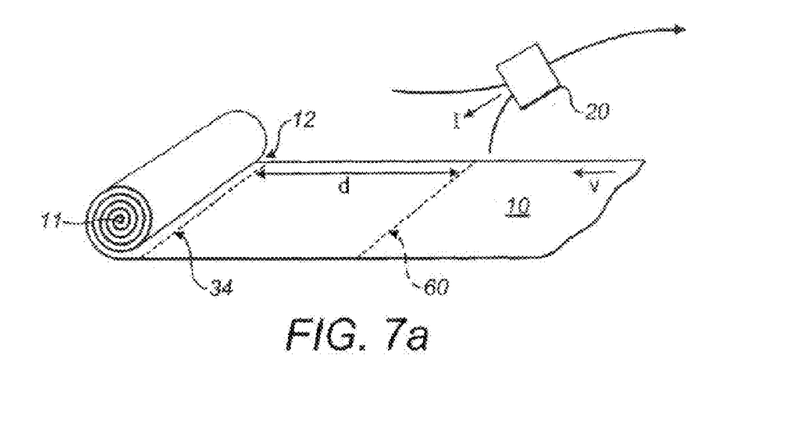
FIG. 7a shows a third embodiment of apparatus arranged for use in the present invention.

FIG. 7 illustrates a third embodiment in which a second line 60 is defined by reference to the first line 34. As shown in FIG. 7a, the second line 60 corresponds to a position spaced by some distance d from the first line 34. For example, the second line 60 may be across the strip 10 approximately 2 metres before the strip 10 it enters the coil 11. As for the first line 34, the second line 60 can take any shape and need not be rectilinear, although it is preferably the same shape as that of the first line 34.

This second line 60, being referenced in the thermal image to the first line 34, 'tracks' movements within the image (due to imager misalignments or coil 'growth' for example).

Radiances and corresponding temperatures can be measured and derived along this second line 60 just as for the first line 34. However the temperatures are now 'apparent' temperatures ($T_a$) because the second line 60 lies outside the region of emissivity enhancement. A plausible threshold for radiance or apparent temperature can be set and the second line terminated at the strip edges in the same manner as the first line 34.

Figure 7B:
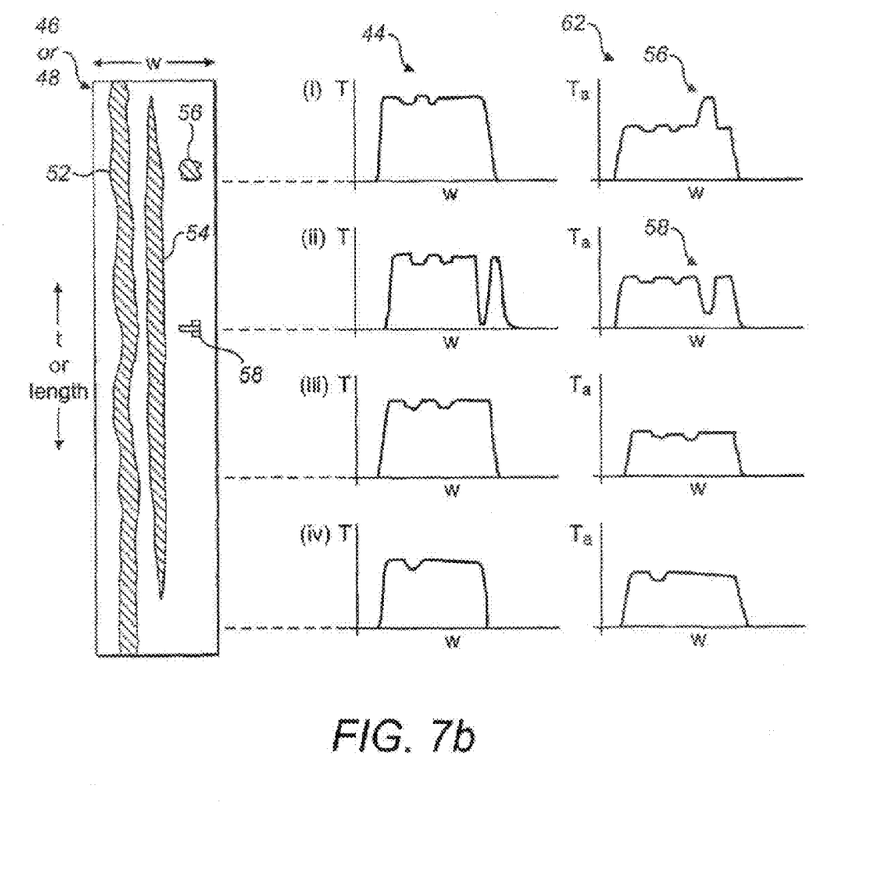
FIG. 7b depicts a thermal map of the sheet material shown in FIG. 7a and associated temperature profiles (i) to (iv).

The apparent temperatures $T_a$ are plotted along the second line as a profile or map just as for the first line. FIG. 7b shows a (temporal or spatial) thermal map derived from the first line 34 alongside representative temperature profiles 44 and apparent temperature profiles 62, the latter derived from the second line 60.

The system can look for anomalous patterns in the apparent temperature profiles or maps and sound an alarm, just as in the first and second embodiments.

There is benefit in working with apparent temperature for certain types of anomaly. For example if there is a spill of light oil 56 on to an aluminum strip it will attain the strip temperature but have much higher emissivity than the strip. Therefore its presence is seen as a large positive anomaly in apparent temperature as derived from the data taken from the second line 60 (indicated as 56 in apparent temperature profile 62 of FIG. 7b (i)).

The imager operating wavelength can be chosen so as to more fully exploit such effects. For example most hydrocarbons will have high emissivity near 3.4 microns wavelengths so a narrow operating waveband, for example approximately 3.3 to 3.5 microns, will give high sensitivity to these materials.

In identifying anomalies use can be made of the fact that most real strip temperature features are elongated as illustrated in FIG. 7*b*. As such, each feature appear in very many successive profiles (frames). In contrast, an object, for example a stray bolt 58, on the strip will feature in perhaps just one profile (frame).

Given the true temperature map from the first line 34 and the apparent temperature map from second line 60, one can compute an emissivity map. This is in effect a map of the surface finish of the strip and potentially may be used as a means of monitoring surface finish.

Similarly one can compute and monitor in substantially real time an emissivity profile.

Emissivity can be calculated in a number of ways. In one example, an emissivity profile is computed from the second temperature profile 44 and the apparent temperature profile 62, taken from the same frame of the thermal image generated by camera 20. For each temperature value of profile 44 and each apparent temperature value of profile 62, the Planck function and known radiation waveband are used to calculate the corresponding black body radiance. For each point along the profile, the emissivity can be determined by ratioing the calculated radiances. A temporal or spatial emissivity map may be built up using the emissivity profile generated in each frame.

Alternatively, emissivity could be calculated directly from the radiance information gathered by the camera 20 and present in the original thermal image. The observed radiances on the two lines 34 and 62 can be ratioed to give the emissivity either before the data is converted to temperature or without converting to temperature.

If a strip speed sensor is added, then the emissivity profiles and map may be computed exactly correctly—i.e. using the first line data from one frame and the second line data from another to offset the temperature and apparent temperature lines and correctly calculate emissivity for each position along the strip. However, given the elongate nature of most features this may not be necessary and it may suffice to calculate emissivities from first line 34 and second line 60 data taken from the same frame.

The output from the system includes temperature profile(s) and/or map(s) as discussed above plus any alarm signals. Data is preferably transferred via an ethernet connection to a plant computer 24. A standard data format—eg OPC—is preferably employed. The profile and/or map data is preferably also displayed on a screen.

The invention claimed is:

1. A method of measuring the temperature of a sheet material arranged such that the sheet material forms at least one side of a cavity so as to enhance the effective emissivity of the sheet material in the vicinity of the cavity, the method comprising:
   a) generating a thermal image of at least part of the inside of the cavity using a thermal imaging device to detect radiation emitted by the cavity, the thermal image comprising a plurality of pixels each having a pixel value representative of radiation emitted by a respective region of the cavity;
   b) identifying a first subset of the plurality of pixels whose pixel values meet predetermined criteria;
   c) using the identified first subset of pixels to determine a line on the thermal image representative of optimal emissivity enhancement in the cavity; and
   d) selecting a second subset of the plurality of pixels based on the determined line and generating a temperature profile along the determined line derived from the pixel values associated with each of the second subset of pixels.

2. A method according to claim 1 further comprising repeating steps a) to d) at a predetermined frame rate.

3. A method according to claim 1 wherein the first subset of pixels is identified by selecting the pixel having the highest pixel value from each of at least two of the columns of the thermal image.

4. A method according to claim 1 wherein the first subset of pixels is identified by selecting the pixel having the highest pixel value from each of at least two of the rows of the thermal image.

5. A method according to claim 1 wherein the line representative of optimal emissivity enhancement in the cavity comprises the first subset of pixels.

6. A method according to claim 1 wherein the line representative of optimal emissivity enhancement in the cavity is determined by generating a line which best fits the first subset of pixels.

7. A method according to claim 1 wherein the line representative of optimal emissivity enhancement in the cavity is rectilinear.

8. A method according to claim 1 wherein the line representative of optimal emissivity enhancement in the cavity is a polynomial or comprises more than one linear section.

9. A method according to claim 1 wherein in step (d), selecting the second subset of pixels comprises: (i) identifying pixels nearest to the determined line, the identified pixels forming the second subset.

10. A method according to claim 9 wherein in step (i), the pixels nearest to the determined line are chosen by selecting the nearest pixel to the determined line from each of at least some of the columns of the thermal image.

11. A method according to claim 9 wherein in step (i), the pixels nearest to the determined line are chosen by selecting the nearest pixel to the determined line from each of at least some of the rows of the thermal image.

12. A method according to claim 9, wherein in step d), selecting the second subset of pixels further comprises:
   (ii) for each of at least some of the pixels identified in step (i), defining an array of pixels including the identified pixel, comparing the pixel values of the pixels within the array to locate the pixel having the highest pixel value within the array, and replacing the pixel identified in step (i), with the located pixel in the second subset.

13. A method according to claim 12, wherein the array has a pre-defined size of n×m pixels, n and m being adjustable.

14. A method according to claim 13, wherein the array has a pre-defined size of 5×5 pixels.

15. A method according to claim 12, wherein the array is centered on the identified pixel.

16. A method according to claim 1, further comprising:
   d1) comparing the pixel values associated with the second subset of pixels with a threshold value to identify one or more edges of the sheet material, terminating the determined line so as not to extend beyond any identified edge(s) and revising the second subset of pixels based on the terminated line.

17. A method according to claim 16 where the threshold value is adjustable.

18. A method according to claim 16 wherein the threshold value is based on a function of the pixel values associated with the revised second subset of pixels in a previous image frame.

19. A method according to claim 1, further comprising:
   e) performing a co-ordinate transformation to produce a second temperature profile related to true position along a direction on a sheet material, based on known geometry of the cavity and the thermal imaging device.

20. A method according to claim 19 wherein the sheet material is moving and comprises a strip having a width transverse to its direction of motion, and the second temperature profile is along the width of the strip.

21. A method according to claim 19, further comprising:
f) generating a temporal thermal map of the sheet material based on the second temperature profile generated for each frame, the map having co-ordinates of time vs. position along a direction of the sheet material.

22. A method according to claim 21, further comprising:
g) monitoring motion of the sheet material and generating a spatial thermal map of the sheet material based on the second temperature profile generated for each frame and the distance moved by the sheet material between frames, the map having co-ordinates of distance along a motion direction of the sheet material vs. position along a direction of the sheet material.

23. A method according to claim 22, further comprising:
h) defining a second line of the thermal image spaced from and referenced to the determined line representative of optimal emissivity enhancement in the cavity; selecting a third subset of the plurality of pixels based on the second line and generating an apparent temperature profile along the second line derived from the pixel values associated with each of the third subset of pixels.

24. A method according to claim 23 wherein the second line represents a region of the sheet material outside the region of emissivity enhancement.

25. A method according to claim 23, further comprising:
i) performing a co-ordinate transformation to produce a second apparent temperature profile related to true position along a direction on the sheet material, based on known geometry of the cavity and the thermal imaging device.

26. A method according to claim 25, further comprising:
j) generating a temporal apparent thermal map of the sheet material based on the second apparent temperature profile generated for each frame, the map having co-ordinates of time vs. position along a direction of the sheet material.

27. A method according to claim 26, further comprising:
k) monitoring motion of the sheet material and generating a spatial apparent thermal map of the sheet material based on the second apparent temperature profile generated for each frame and the distance moved by the sheet material between frames, the map having co-ordinates of distance along a motion direction of the sheet material vs. position along a direction of the sheet material.

28. A method according to claim 27, further comprising:
l) generating an emissivity profile or emissivity map based on a comparison of the first or second temperature profile, or temporal or spatial thermal map derived from the line determined in step c), with the respective apparent profile or map derived from the second line defined in step h).

29. A method according to claim 28, further comprising:
m) comparing the generated temperature profile, apparent temperature profile, emissivity profile, thermal map or emissivity map with predetermined limits and triggering an alarm signal if a value falls outside the predetermined limits.

30. A method according to claim 29, further comprising:
n) performing pattern recognition on the generated temperature profile, apparent temperature profile, emissivity profile, thermal map or emissivity map to detect anomalous patterns and triggering an alarm signal if an anomalous pattern is detected.

31. A method according to claim 1, wherein the detected radiation is infrared radiation having a wavelength of approximately 3 to 5 microns or approximately 8 to 14 microns.

32. A method according to claim 1 wherein the pixel values correspond to radiance and step d) comprises converting the radiance values of at least the second subset of pixels to temperature values using the Planck function and the known wavelength band of the radiation.

33. A method according to claim 1 wherein the cavity is defined between the sheet material and a roller arranged to support the sheet material.

34. A method according to claim 33 wherein the sheet material is wound onto the roller, the roller comprising a mandrel.

35. A method according to claim 1 wherein the sheet material is selected from the group consisting of aluminum strip, steel strip or bright steel strip.

36. A method according to claim 33 where the sheet material is selected from the group consisting of steel strip or bright steel strip.

37. A method according to claim 34 wherein the sheet material is aluminium strip.

38. A temperature-measurement system adapted to perform a method of measuring the temperature of a sheet material arranged such that the sheet material forms at least one side of a cavity so as to enhance the effective emissivity of the sheet material in the vicinity of the cavity, the system comprising:
a thermal imaging device arranged to view at least part of the cavity, and being adapted to detect radiation emitted by the cavity to thereby generate a thermal image of at least part of the inside of the cavity, the thermal image comprising a plurality of pixels each having a pixel value representative of radiation emitted by a respective region of the cavity; and
a processor adapted to:
identify a first subset of the plurality of pixels whose pixel values meet predetermined criteria;
use the identified first subset of pixels to determine a line on the thermal image representative of optimal emissivity enhancement in the cavity; and
select a second subset of the plurality of pixels based on the determined line and generate a temperature profile along the determined line derived from the pixel values associated with each of the second subset of pixels.

39. A temperature-measurement system according to claim 38 wherein the thermal imaging device comprises an uncooled microbolometer detector array.

40. A temperature-measurement system according to claim 38, further comprising a mount adapted to support the thermal imaging device, the mount arranged to enable rotation of the thermal imaging device about at least one axis.

41. A temperature-measurement system according to claim 40 wherein the sheet material is moving and the mount enables the thermal imaging device to rotate about two orthogonal axes of which one axis is substantially perpendicular to the direction of motion of the sheet material.

42. A temperature-measurement system according to claim 40 wherein the mount is arranged to enable rotation of the thermal imaging device about three orthogonal axes.

43. A temperature-measurement system according to claim 38 further comprising a protective housing containing the thermal imaging device.

44. A temperature-measurement system according to claim 38 further comprising a plant computer to which the results of the processor are output.

45. A temperature-measurement system according to claim 38 wherein the processor is connected to the thermal imaging device via a connection selected from the group consisting of an Ethernet connection, an internet connection, a TCP/IP connection, an object linking and embedding for process control (OPC) connection, a serial port connection or a wireless connection.

46. A temperature-measurement system according to claim 44 wherein the processor is connected to the plant computer via a connection selected from the group consisting of an Ethernet connection, an internet connection, an intranet connection a TCP/IP connection, an object linking and embedding for process control (OPC) connection, a serial port connection or a wireless connection.

* * * * *